United States Patent [19]
Goldstein

[11] Patent Number: 4,727,593
[45] Date of Patent: Feb. 23, 1988

[54] PASSIVE LINE-OF-SIGHT OPTICAL SWITCHING APPARATUS

[76] Inventor: Pinchas Goldstein, 63 Shahal Street, Jerusalem, Israel

[21] Appl. No.: 789,163

[22] Filed: Oct. 18, 1985

Related U.S. Application Data

[60] Division of Ser. No. 686,616, Dec. 26, 1984, which is a continuation of Ser. No. 361,256, Mar. 24, 1982, abandoned.

[30] Foreign Application Priority Data

Mar. 25, 1981 [IL] Israel .................. 62475
Dec. 20, 1981 [IL] Israel .................. 64595

[51] Int. Cl.$^4$ .................................. H04B 9/00
[52] U.S. Cl. ........................ 455/605; 200/61.02; 455/603
[58] Field of Search ............ 455/603, 605, 604; 200/61.02; 340/555, 556, 557

[56] References Cited

U.S. PATENT DOCUMENTS

| | | | |
|---|---|---|---|
| 3,633,158 | 1/1972 | Heibel | 455/605 |
| 4,023,887 | 5/1977 | Speers | 455/603 |
| 4,099,050 | 7/1978 | Sauermann | 455/605 |
| 4,114,151 | 9/1978 | Denne et al. | 455/605 |
| 4,131,791 | 12/1978 | Lego, Jr. | 455/605 |
| 4,325,146 | 4/1982 | Lennington | 455/604 |
| 4,436,376 | 3/1984 | Fergason | 455/605 |

FOREIGN PATENT DOCUMENTS 1320002 6/1973 United Kingdom .
1338367 11/1973 United Kingdom .

*Primary Examiner*—Joseph A. Orsino, Jr.
*Attorney, Agent, or Firm*—Cushman, Darby & Cushman

[57] ABSTRACT

Line of sight optical communications apparatus comprising a plurality of optical beam reflectors arranged in a protected region for optical communication therebetween, at least one of the reflectors being arranged to reflect a signal received at the reflectors to a base location remote from the protected region. Stabilized reflector apparatus which is insensitive to rotation about axes lying in a given plane and which is particularly useful in the line of sight optical apparatus is also described.

15 Claims, 21 Drawing Figures

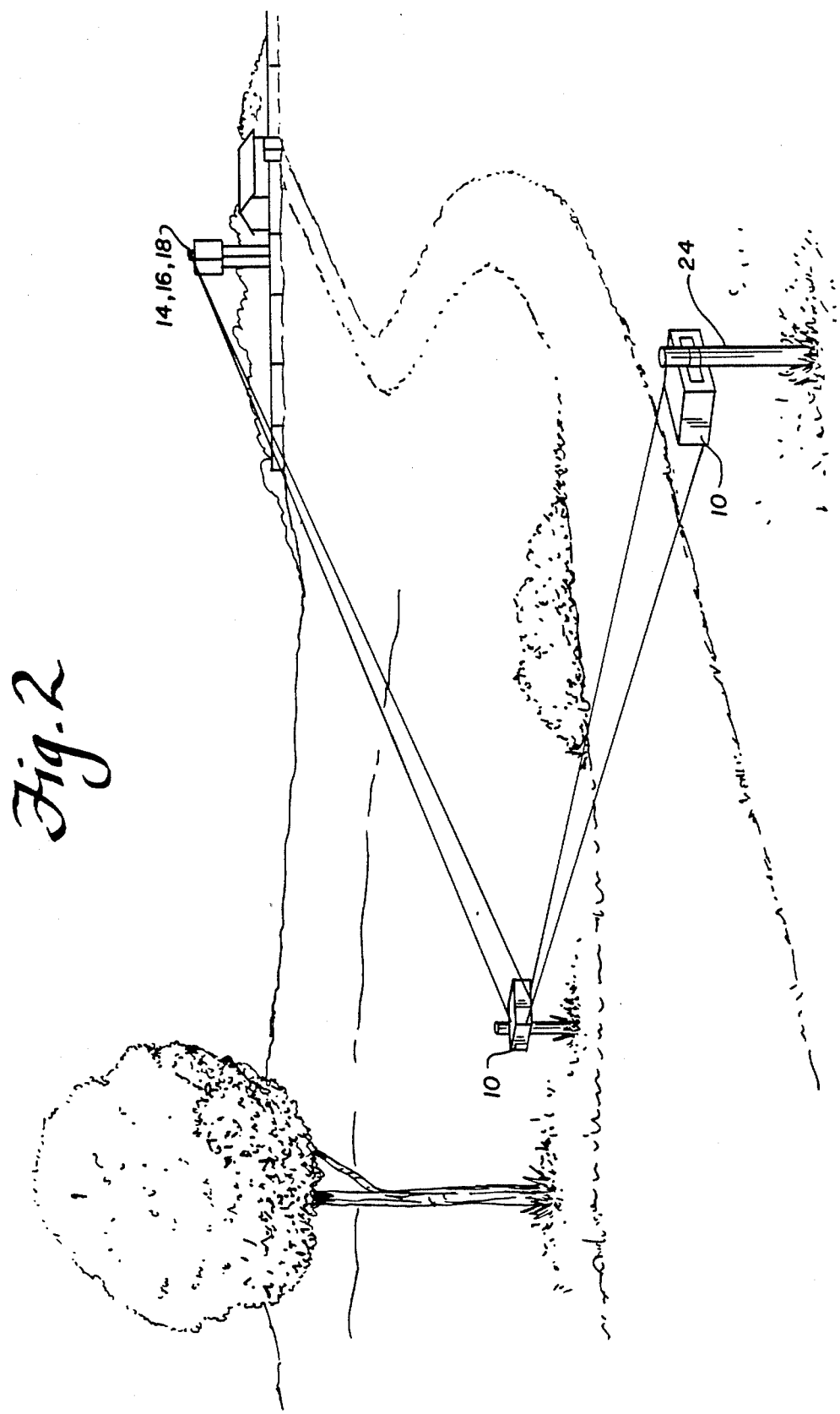

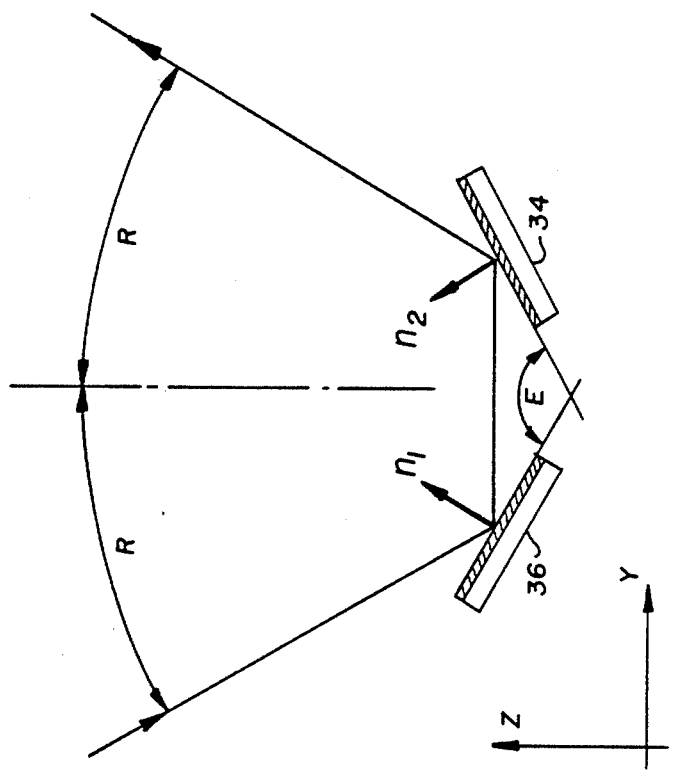
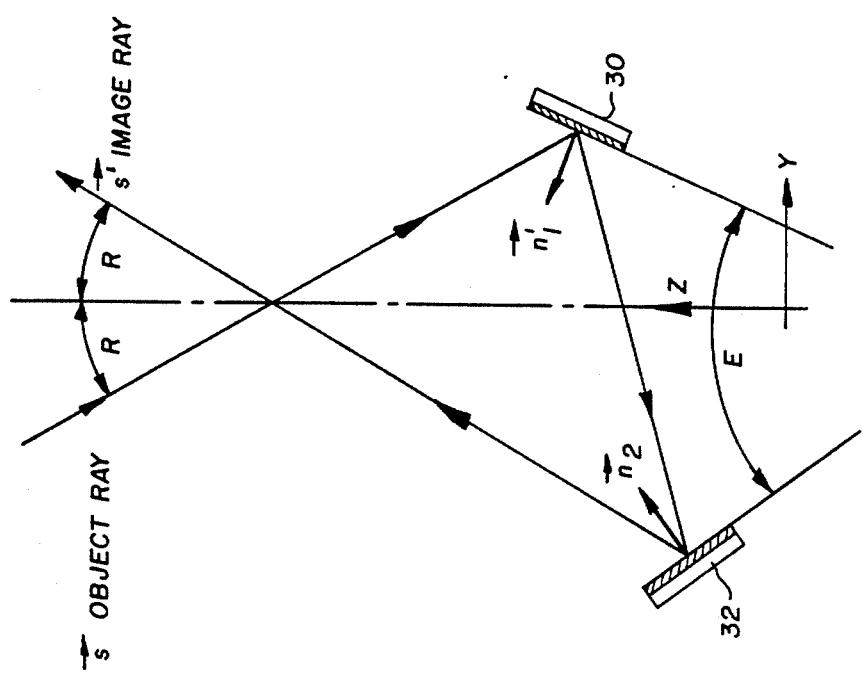
Fig. 3B
Fig. 3A

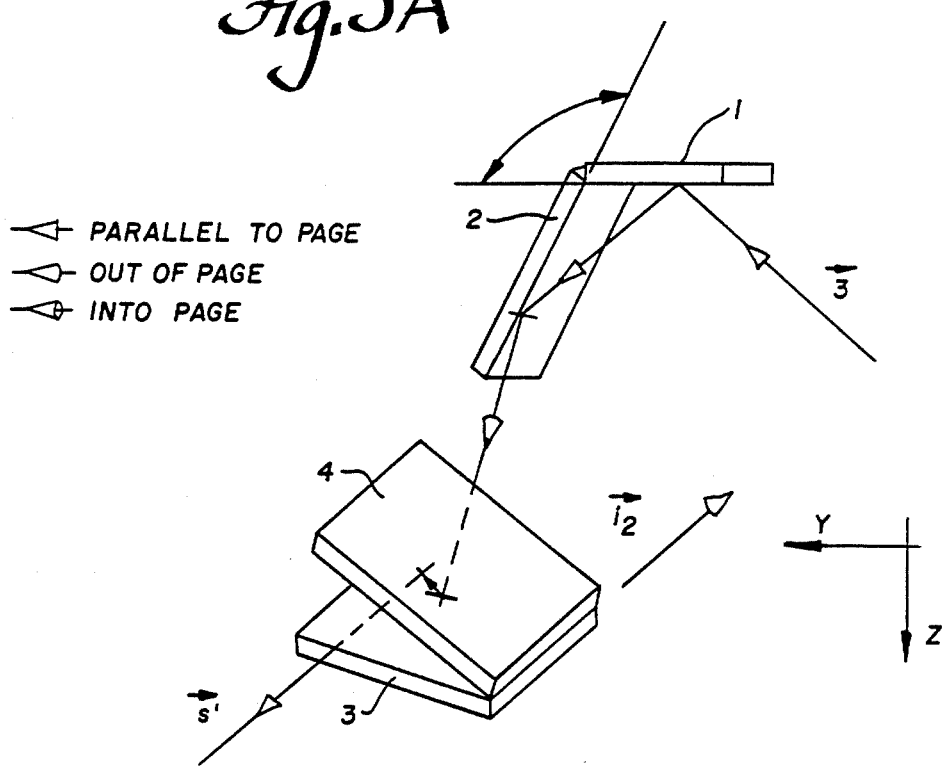
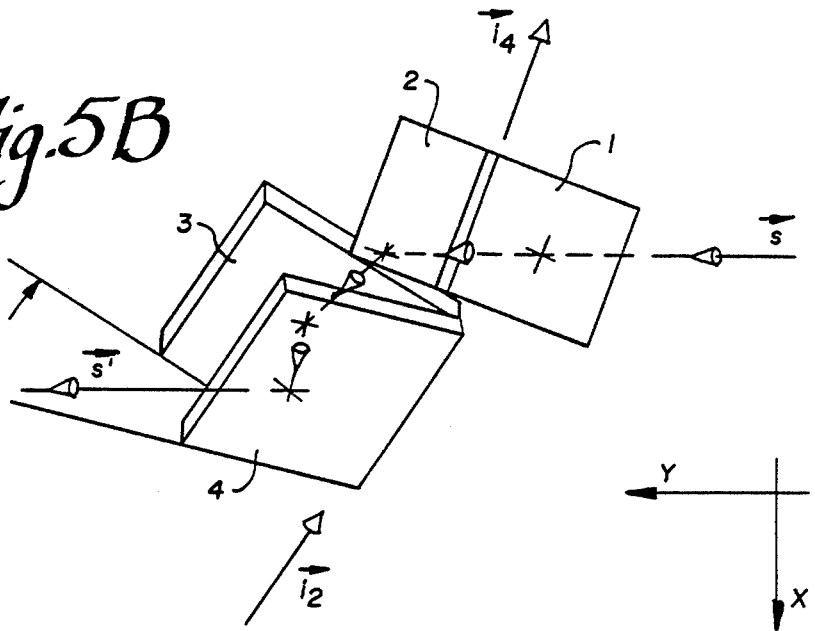

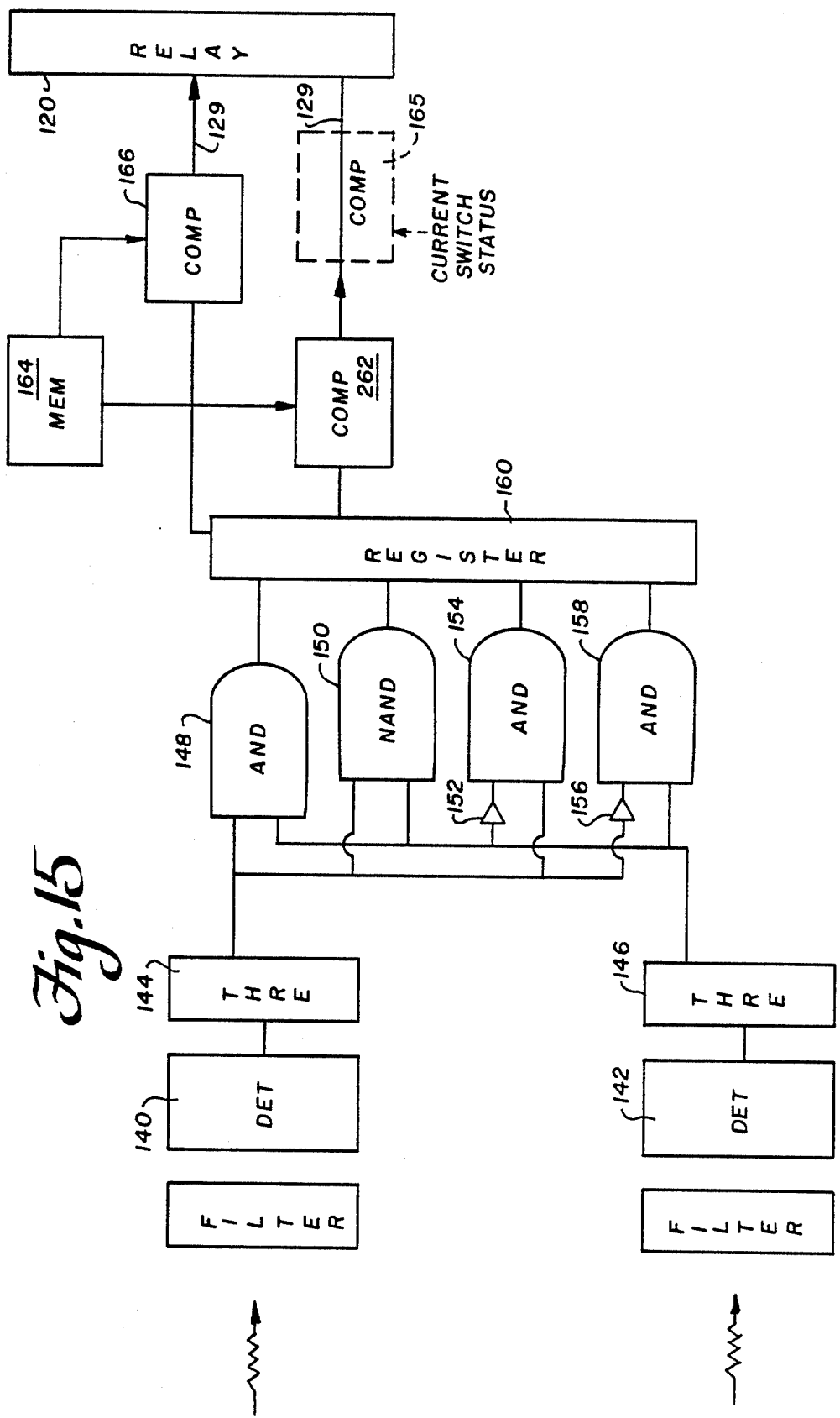

PASSIVE LINE-OF-SIGHT OPTICAL SWITCHING APPARATUS

This is a division of application Ser. No. 686,616 filed Dec. 26, 1984, which was a continuation of Ser. No. 361,256, filed Mar. 24, 1982, now abandoned.

FIELD OF THE INVENTION

The present invention relates to optical systems generally and, more particularly, to line of sight optical systems.

BACKGROUND OF THE INVENTION

Optical line of sight perimeter protection systems have been proposed in which a laser beam is transmitted to a receiver and reflected to a detector, such that crossing of the beam by an intruder provides an alarm indication. Due to problems of stability and alignment, normally only one reflector is employed, such that each straight line to be protected requires a transmitter-receiver combination. Conventional systems of this type involve a number of disadvantages in addition to their significant cost. These disadvantages include the fact that they require the provision of a power supply to the area to be protected and that they are relatively easily detected by potential intruders with the attendant possibility of being disabled.

Stabilized reflector apparatus is also known for returning a beam in a given direction notwithstanding changes in the position of the reflector along a given axis. Examples of known such reflector apparatus are the penta prism in which the angle between incident and exiting beams is always 90° independent of small changes in the orientation of the penta prism in the plane of the incident and exiting beams. A corner cube prism is also known which is operative to reflect incoming beams by exactly 180° independently of the orientation of the corner cube. The stabilized reflector apparatus which is presently known suffers from the disadvantage that it is either limited in the angle of reflection or it is limited in the axis with respect to rotation about which it is independent.

SUMMARY OF THE INVENTION

The present invention seeks to provide line-of-sight optical apparatus which overcomes limitations of the prior art apparatus and also seeks to provide beam reflector apparatus having selectable reflection angles and which is not sensitive to small variations in positions in one or more planes.

There is thus provided in accordance with an embodiment of the present invention passive line-of-sight optical communication apparatus comprising a plurality of optical beam reflectors arranged at a remote location for optical communication therebetween in a network defining a protected region, at least one of the reflectors being arranged for transmitting a signal representing the state of optical communication in the network to a base location remote from the protected region.

Additionally in accordance with an embodiment of the invention at least one of the reflectors is arranged for receiving an incoming optical beam from the base location for transmission in the network.

Alternatively the network is operative to receive signals generated in the protected region.

The term "optical" is not limited in its application to signals within the visible spectrum but extends within a wavelength range of approximately 0.2 microns to 20 centimeters.

The base location may be supplied with video display apparatus and recording apparatus.

Further in accordance with an embodiment of the invention, the network may comprise non 180° reflectors.

It is a particular feature of the invention that an optical beam source and associated receiving display and recording apparatus located at a base location may be employed on a time-shared basis with a plurality of independent mutually remote networks.

The reflectors employed in the system may be conventional mirror systems or prisms of the types described hereinabove. According to a preferred embodiment of the present invention the reflectors are constructed to have selectable angles between incident and exiting beams.

Additionally in accordance with an embodiment of the present invention there is provided stabilized reflector apparatus which is insensitive to rotation of the apparatus about any axis lying in the X-Z plane in a system of co-ordinates wherein the incident and reflected beams lie in the Y-Z plane and Z axis bisects the angle 2R between incident and reflected beams, the reflector apparatus comprising an even plurality of planar mirrors arranged such that $E_t$ the angle between first and second equivalent mirror surfaces and $i$ the unit vector parallel to the line of intersection of the equivalent mirror surfaces fulfill one of the following two conditions:

$$E_t = 90° - R \quad i_t = (1, 0, 0) \tag{1}$$

or $$E_t = 90° + R \quad i_t = (-1, 0, 0) \tag{2}$$

Where the equivalent mirror surfaces comprise more than one mirror then $E_t$ and $i_t$ are defined by the following equations:

$$\cos E_t = \cos E_1 \cos E_2 - (i_1 \cdot i_2) \sin E_1 \sin E_2 \tag{3}$$

and $$i_t = \csc E_t \sin E_1 \cos E_2 \, i_1 + \csc E_t \cos E_1 \sin E_2 \, i_2 - \csc E_t \sin E_2 (i_1 \times i_2) \tag{4}$$

where $E_1$, $i_1$ and $E_2$, $i_2$ are the respective angles and unit vectors for the mirror surfaces or equivalent mirror surfaces which make up each of the first and second equivalent mirror pairs.

It may be appreciated that in this way a mirror system comprising any desired even number of mirrors can be constructed to have the stabilized characteristics indicated above.

Further in accordance with an embodiment of the present invention there is provided stabilized reflector apparatus which is insensitive to rotation about any axis parallel to the X-Y plane in a system of co-ordinates wherein the incident and reflected beams lie in the Y-Z plane and the Z axis bisects the angle 2R between the incident and reflected beams, the reflector apparatus comprising an odd plurality of planar mirrors including an even plurality of planar mirrors having a characteristic $E_t$ and $i_t$ as defined above and first receiving the incident beam and a single mirror last receiving the beam having a perpendicular vector $n_{single}$, wherein the following conditions are fulfilled:

$$90° - R \leq E_t \leq 90° + R \quad (5)$$

$$\cos F = \cos E_t \cot R \quad (6)$$

where F is the angle between $i_t$ and the X-axis and $$n_3 = \pm(\cos E_t \csc R, \sin E_t (\cos R\, i_y + \sin R\, i_z), (\sin E_t \cos R\, i_z - \sin R\, i_y)) \quad (7)$$

where $n_3$ is normal vector to the plane of the single mirror and $i_t = (i_x, i_y, i_z)$ Further in accordance with an embodiment herein there is provided apparatus for monitoring the rotation of a plurality of rotating bodies comprising reflector means mounted on each rotating body for producing a relatively narrow reflected beam and sensor means for sensing the periodicity of receipt of reflected beams for monitoring rotation.

Additionally in accordance with an embodiment of the present invention there are provided prismatic eyeglasses formed of a unitary prism arranged for vision therethrough by both eyes of a wearer.

Still further in accordance with an embodiment of the present invention there is provided communication apparatus comprising a beam transmitter and a beam receiver, the receiver comprising a retroreflector, a modulator and a transducer, the transducer powering the modulator from a portion of the received beam energy. The modulator modulates the received beam which is then reflected back to the transmitter by the retroreflector thus providing information from the beam receiver to the transmitter. It is appreciated that the beam receiver may be an entirely passive device having no energy source other than the received beam and may be located at a remote location which is relatively inaccessible.

BRIEF DESCRIPTION OF THE DRAWINGS

The present invention will be more fully understood and appreciated from the following detailed description taken in conjunction with the drawings in which:

FIG. 2 is a pictorial illustration of a reflector useful in the system of FIG. 1;

FIGS. 3A and 3B are schematic illustrations of stabilized mirror systems constructed in accordance with alternative embodiments of the present invention;

FIGS. 5A and 5B are two views of a four mirror stabilized mirror system constructed and operative in accordance with an embodiment of the present invention;

FIG. 15 is a block diagram illustration of circuitry employed in the remote switch apparatus of FIG. 14.

DETAILED DESCRIPTION OF THE INVENTION

Figure 1:
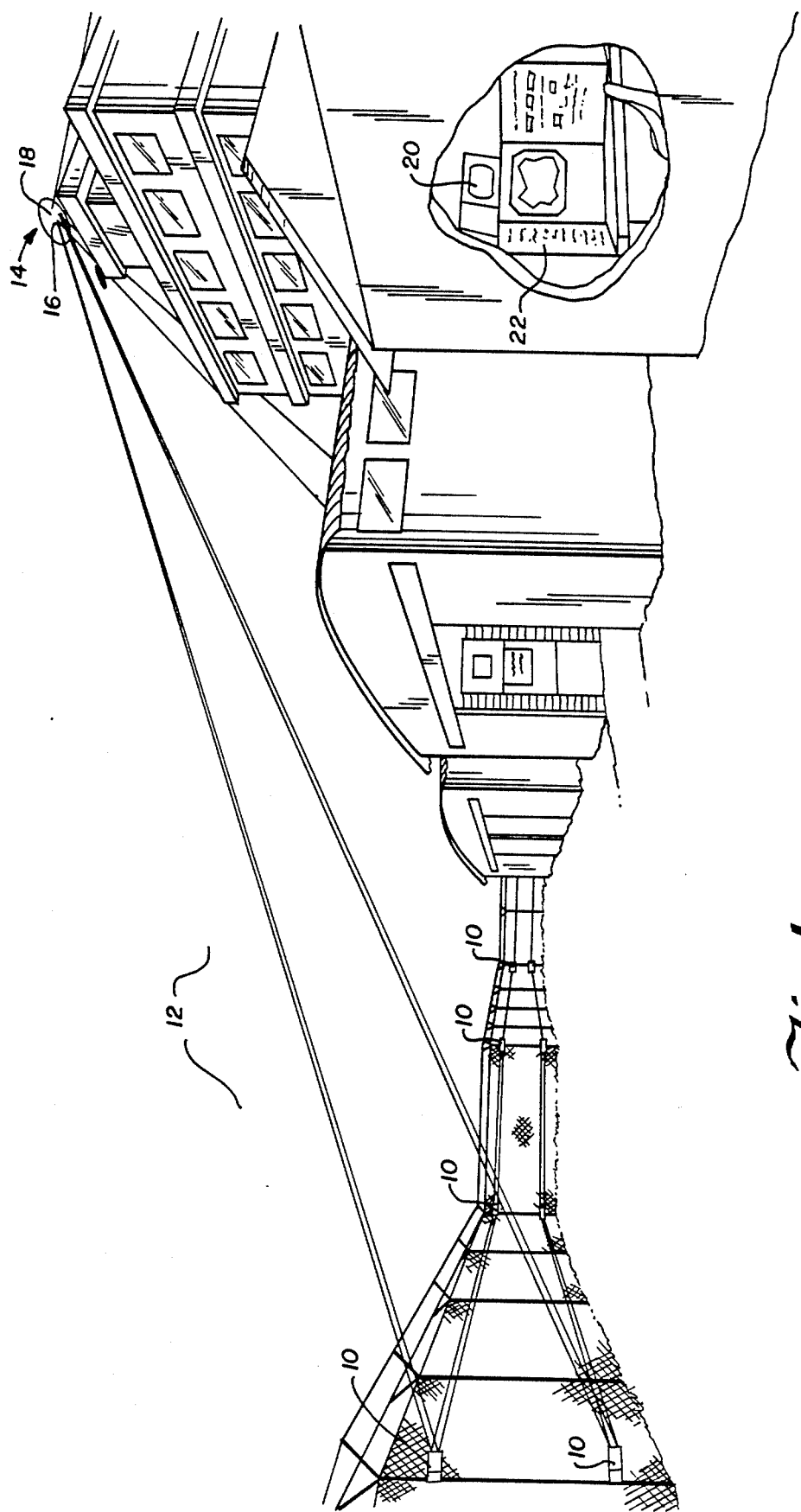
FIG. 1 is a schematic illustration of line of sight optical communications apparatus constructed and operative in accordance with an embodiment of the present invention.
Figure 4A:
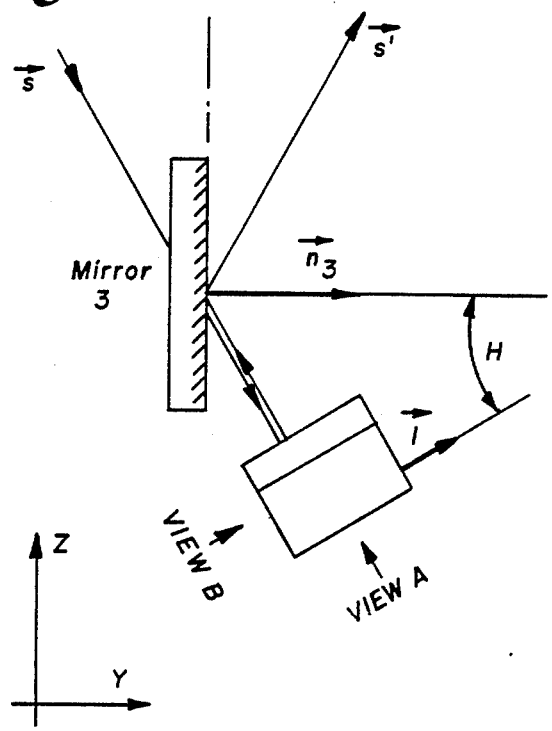
FIG. 4A is an illustration of a stabilized mirror system comprising three mirrors constructed and operative in accordance with an embodiment of the present invention.
Figure 4B:
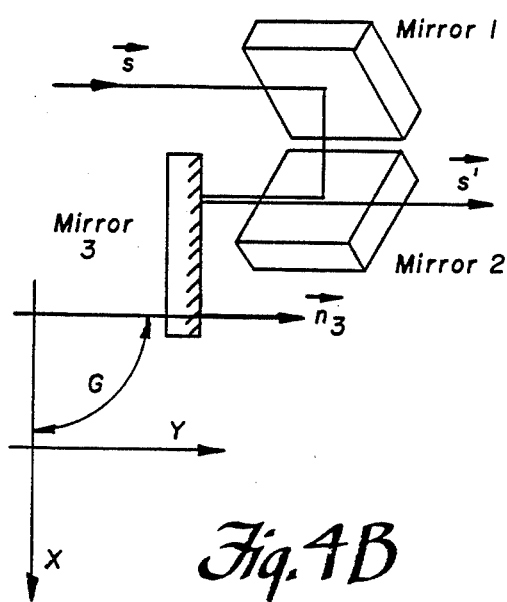
FIGS. 4B, 4C and 4D are illustrations of the mirror system of FIG. 4A taken in different directions as indicated by the axes and vectors drawn thereon.
Figure 4C:
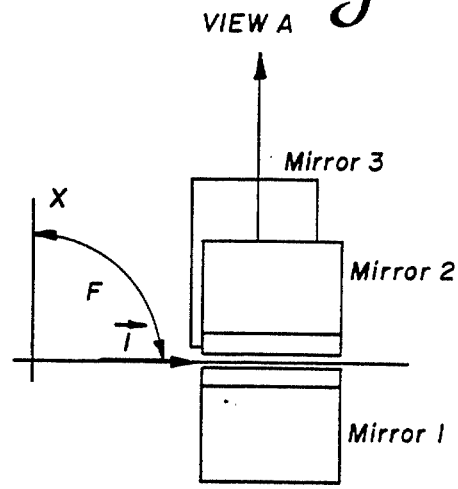
Figure 4D:
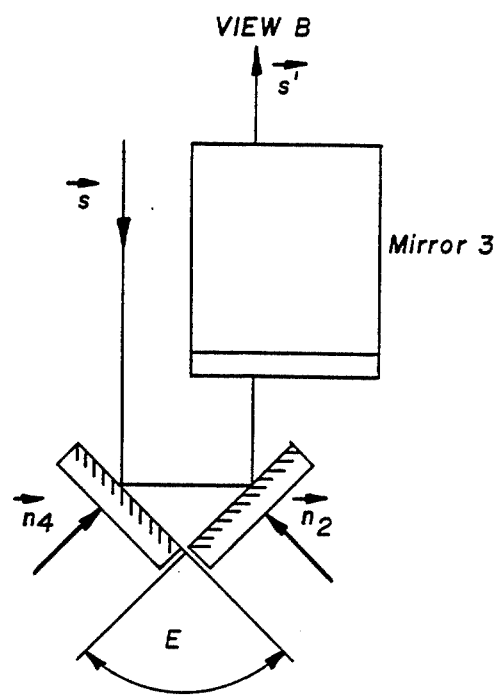

Reference is now made to FIG. 1 which shows a line-of-sight optical communications system constructed and operative in accordance with an embodiment of the present invention and comprising a plurality of optical beam reflectors 10 arranged in a protected region 12 for optical communication with a sensing station 14 at a base location. It is a particular feature of the present invention that optical beam reflectors 10 may be entirely passive and thus require no power source associated therewith.

According to one embodiment of the present invention and as illustrated herein, the optical beam reflectors 10 may be arranged along a perimeter to be protected against intrusion at a location remote from the base location. A transmitter 16 located at the base location is operative to transmit an optical beam to a reflector 10. The arrangement of the reflectors is such that the beam is caused to pass along the perimeter unless it is interrupted by an intruder and once having passed along the perimeter is reflected back to the base location. The absence of a return beam in this embodiment indicates a possible intrusion.

According to an alternative embodiment of the invention, transmitter 16 is omitted and the reflectors 10 are arranged to reflect any optical signal, inside or outside of the visible spectrum, such as for example, a vehicle headlight or alternatively thermal energy, to the base location sensing station 14.

It is appreciated that in both of these embodiments the reflectors 10 located at the remote location are entirely passive and require no energy source of their own.

Base location sensing station 14 may comprise a directable optical sensor 18 or a fixed optical sensor. A directable optical sensor 18 is preferred since it enables the sensing station 14 to be operated in a time-sharing mode with a plurality of mutually remote protected locations without requiring duplication of the apparatus of sensing station 14.

Sensing station 14 may also comprise a display such as a video display 20 and suitable recording and alarm indicating apparatus 22.

It is to be appreciated that throughout the specification and claims, the term optical shall not be limited necessarily to the visible spectrum but shall cover signals and radiation in a wavelength range of 0.2 microns to 20 cm.

Reference is now made to FIG. 2 which illustrates a portion of a perimeter protection system employing the line-of-sight optical communications system constructed and operative in accordance with an embodiment of the present invention. Here optical beam reflectors 10 are seen mounted onto posts 24 for transmitting optical beams along the perimeter of a network. It is noted that optical beam reflectors 10 include reflectors which provide other than 180° beam reflection.

It is appreciated that in order that the apparatus of FIGS. 1 and 2 be enabled to operate with protected regions at significant distances from the base location, relatively narrow beams must be used. The use of relatively narrow beams in turn requires that the alignment of the reflectors be maintained accurate to a high tolerance. In practice stabilization of mirror systems has proved to be quite difficult and with few exceptions, as noted above, such systems are not presently known or in use.

In accordance with the present invention there are provided stabilized reflectors which are insensitive to rotation of the reflector about certain sets of axes. Thus by using such a stabilized reflector and fixing it along a given axis such that axial motion is prohibited, other motion of the reflector does not affect its operation in receiving and reflecting light in given directions. Stabilized reflectors of this type are extremely useful in the invention described hereinabove although they are not required as a part thereof. The use of stabilized reflectors in the apparatus of FIGS. 1 and 2 is a preferred embodiment of that apparatus.

Referring now to FIGS. 3-6 there will be shown a number of examples of stabilized mirror systems constructed and operative in accordance with an embodiment of the present invention. It is noted that the stabilized mirror systems of the present invention are not limited to the particular examples seen in FIGS. 3-6 and that the scope of the invention in this regard is considerably broader than the individual examples.

Reference is now made to FIGS. 3A and 3B which illustrate two alternative embodiments of two mirror stabilized reflecting systems constructed and operative in accordance with an embodiment of the present invention. It is noted that these figures as well as the remainder of FIGS. 3-6 all refer to the same co-ordinate system and symbols wherein the incoming beam s, identified as as the object ray and the reflected beam s', identified as the image ray both lie in the Y-Z plane, the incoming beam s and the reflected beam s' are separated by an angle 2R and the Z-axis bisects this angle of separation. E is defined as the angle between the mirror surfaces and i is the unit vector parallel to the line of intersection of the two mirror surfaces. The unit vector i is defined as follows:

$$i = \csc E \cdot n_2 \times n_1 \quad (8)$$

where n is the unit vector normal to a mirror surface.

The two alternative embodiments of two mirror stabilized reflecting systems respectively satisfy the conditions of equations (1) and (2) set forth hereinabove. Both embodiments are insensitive to rotation about any axis parallel to the X-Z plane.

FIG. 3A shows the embodiment of mirror system which satisfies the conditions of equation (1). This mirror system comrises first and second planar mirrors 30 and 32 whose mirror surfaces lie parallel to the X axis and are separated by an angle $E = 90° - R$.

FIG. 3B shows the embodiment of mirror system which satisfies the conditions of equation (2). This mirror system comprises first and second planar mirrors 34 and 36 whose mirror surfaces lie parallel to the X axis and are separated by an angle $E = 90° + R$.

It is a particular feature of the present invention that a mirror system with any even number of mirrors can be constructed to be insensitive to rotation about any axis parallel to the X-Z plane. A system having any even number of mirrors may be constructed by reference to equations (3) and (4) which teach the equivalent E total, $E_t$ and i total $i_t$ for a pair of mirror pairs, each of which has its own E and i. In this manner, once the desired R is known a mirror system of any desired even number of mirrors which is insensitive to rotation about any axis parallel to the X-Z plane can be constructed.

Reference is now made to FIGS. 5A and 5B which illustrate a four-mirror stabilized mirror system which is insensitive to rotation about any axis parallel to the X-Z plane and which is constructed in accordance with the above teachings.

The mirror system illustrated in FIGS. 5A and 5B fulfills the conditions of equation (2) above and is designed to deviate a light ray by 80°. It follows that $R = 50°$ and the parameters of the system are given as follows:

$$E_t = 140° \quad i_t = (-1, 0, 0) \quad (9)$$

If one then takes a given $E_1$ and $i_1$ to be $$E_1 = 120° \quad i_1 = (-0.940, -0.342, 0) \quad (10)$$

and selects the first two mirrors upon which the incoming beam is incident to be positioned such that the vectors perpendicular thereto are:

$$n_1 = (0, 0, 1) \quad n_2 = (0.296, -0.814, 0.500) \quad (11)$$

one can then solve equations (3) and (4) to find $E_2$, $i_2$, $n_3$ and $n_4$ as follows:

$$E_2 = 25.03° \quad (12)$$

$$i_2 = (-0.714, -0.536, -0.450) \quad (13)$$

The third and fourth mirrors may then be positioned such that the vectors perpendicular thereto are:

$$n_3 = (0.533, 0, -0.846) \quad (14)$$

$$n_4 = (-0.675, 0.357, 0.646) \quad (15)$$

In FIGS. 5A and 5B, the mirrors are labeled 1-4 in the order that they receive the incident beam.

Reference is now made to FIGS. 4A-4D which illustrate a mirror system which is insensitive to rotation about any axis parallel to the X-Y plane. The mirror system illustrated in FIGS. 4A-4D comprises 3 mirrors, but it is appreciated that any odd number of mirrors above 3 may also be employed. In the generalized case the total odd number of mirrors is considered to comprise an even number of mirrors and a single mirror which receives the beam from the even number of mirrors. The construction of a mirror system having an even number of mirrors has been discussed above and it is known how to determine the E total and i total of such a system.

In accordance with the present invention, the conditions are placed on the mirrors in an odd-numbered mirror system which is insensitive to rotation about any axis parallel to the X-Y plane are set forth in expressions (5), (6) and (7) hereinabove. The embodiment illustrated in FIGS. 4A-4D is one example of a mirror system which satisfies these conditions.

Figure 6A:
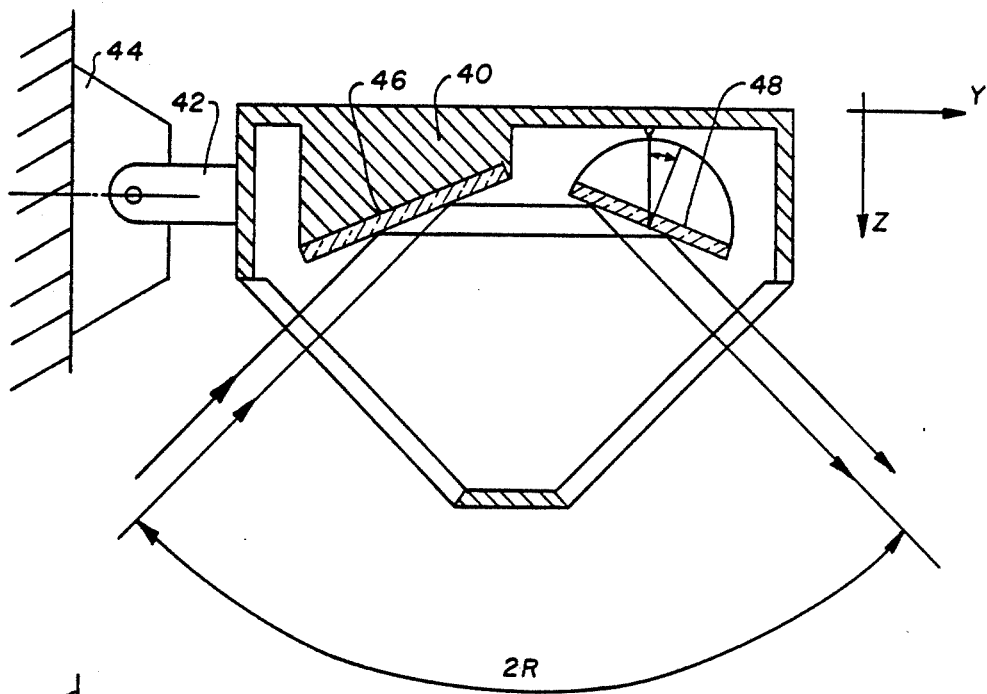
FIGS. 6A and 6B are illustrations of a steerable two mirror stabilized mirror system in respective first and second orientations.
Figure 6B:
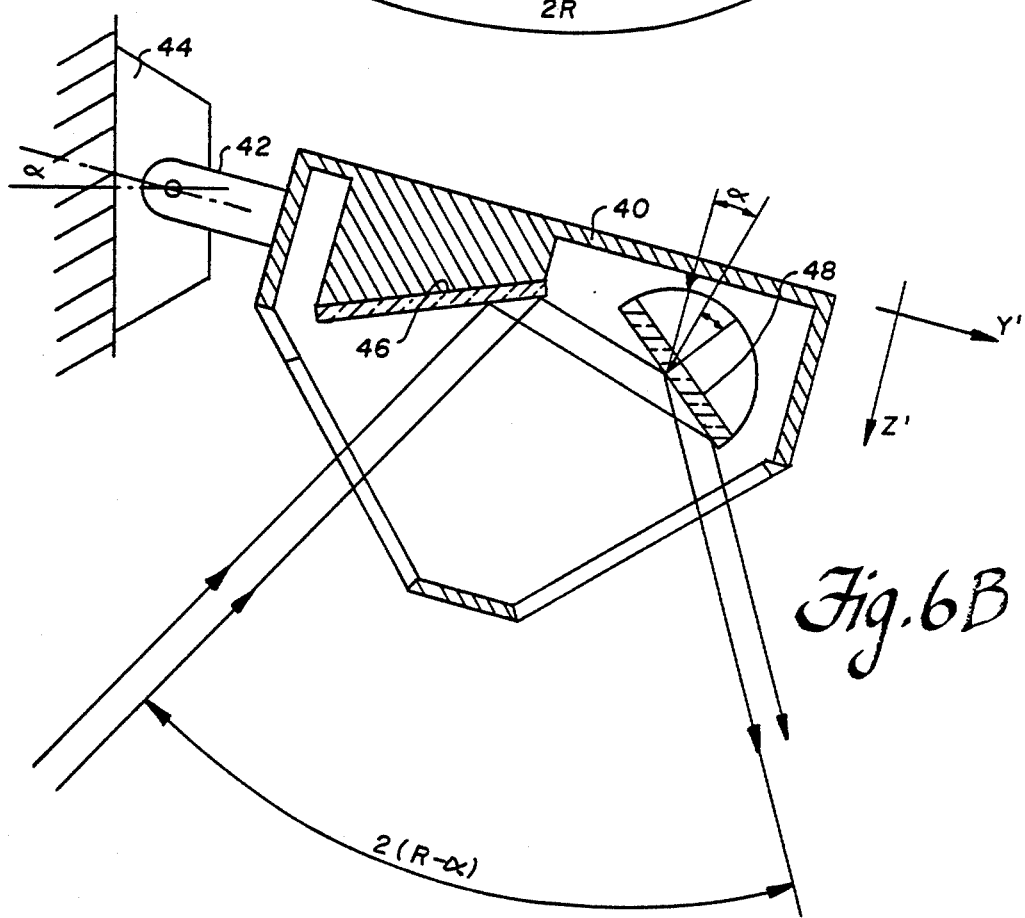

Reference is now made to FIGS. 6A and 6B which illustrate an exemplary steerable stabilized mirror system constructed and operative in accordance with an embodiment of the present invention and comprising a pair of mirrors which are insensitive to rotation of the entire system about any axis parallel to the X-Z plane similarly to the apparatus shown in FIGS. 3A and 3B.

In contrast with the apparatus of FIGS. 3A and 3B wherein the mirrors are selected to be static once their relative positions are fixed, in the embodiment of FIGS. 6A and 6B, one of the two mirrors is arranged for selectable steerable movement, so as to enable the angle R to be selected and changed conveniently.

The steerable mirror system of FIGS. 6A and 6B comprises a housing 40 which is mounted by means of a fixable pivotable mounting 42 onto a fixed base 44. Fixedly mounted in housing 40 is a first mirror 46 which receives an incoming beam and reflects it onto a second mirror 48 which is selectably steerable. As noted by comparing the two orientations of mirror 48 in FIGS. 6A and 6B respectively it can be seen that by selecting the position of mirror 48, one determines the angle 2R, i.e. the angle between incident and reflected beams.

It is noted that since the co-ordinate system used throughout defines the Z-axis as the axis which bisects the angle 2R, a change in R requires a corresponding change in the mounting of the housing to compensate therefor, as indicated in FIG. 6B.

Figure 7:
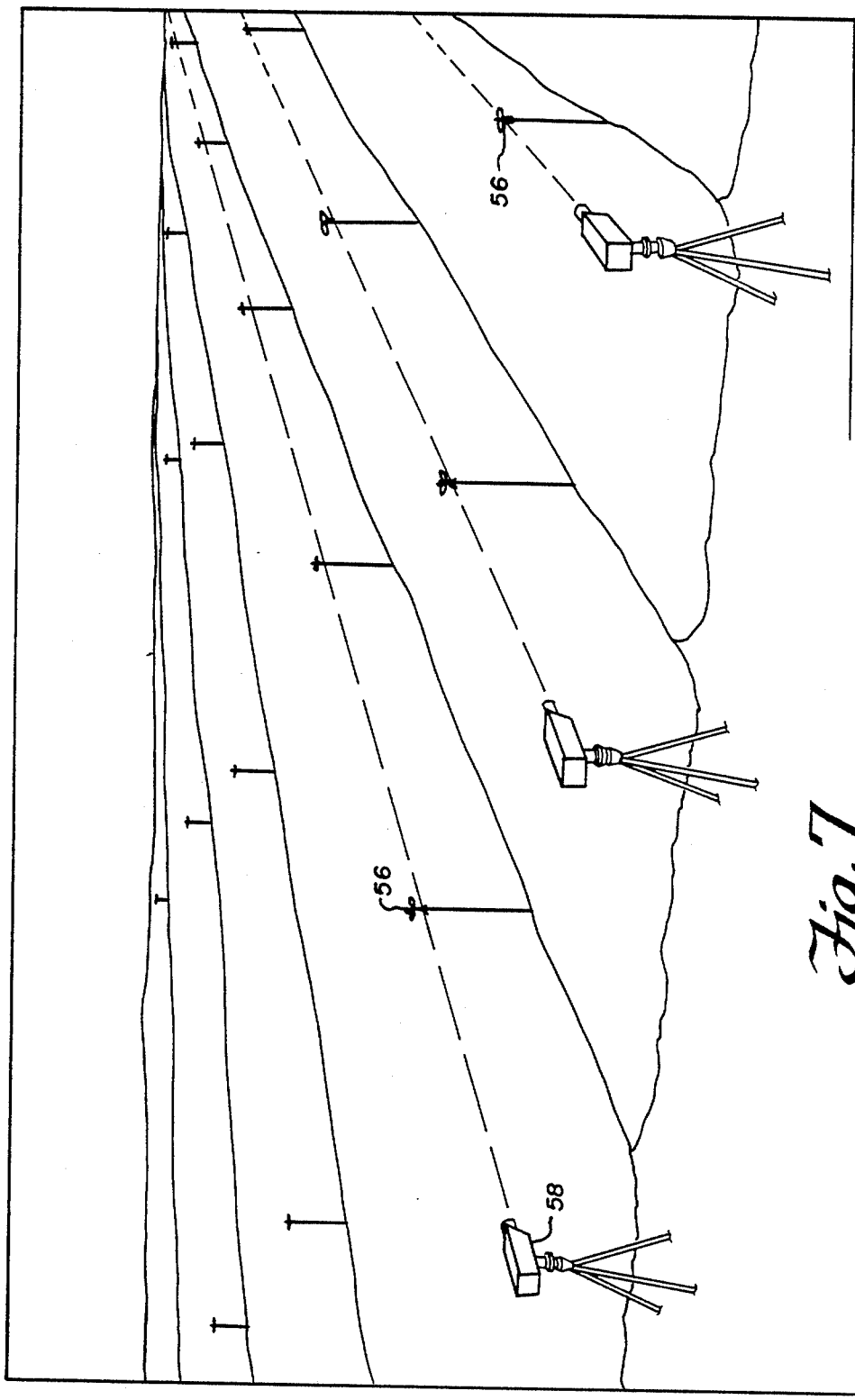
FIG. 7 is a pictorial illustration of rotation monitoring apparatus constructed and operative in accordance with an embodiment of the present invention.
Figure 8:
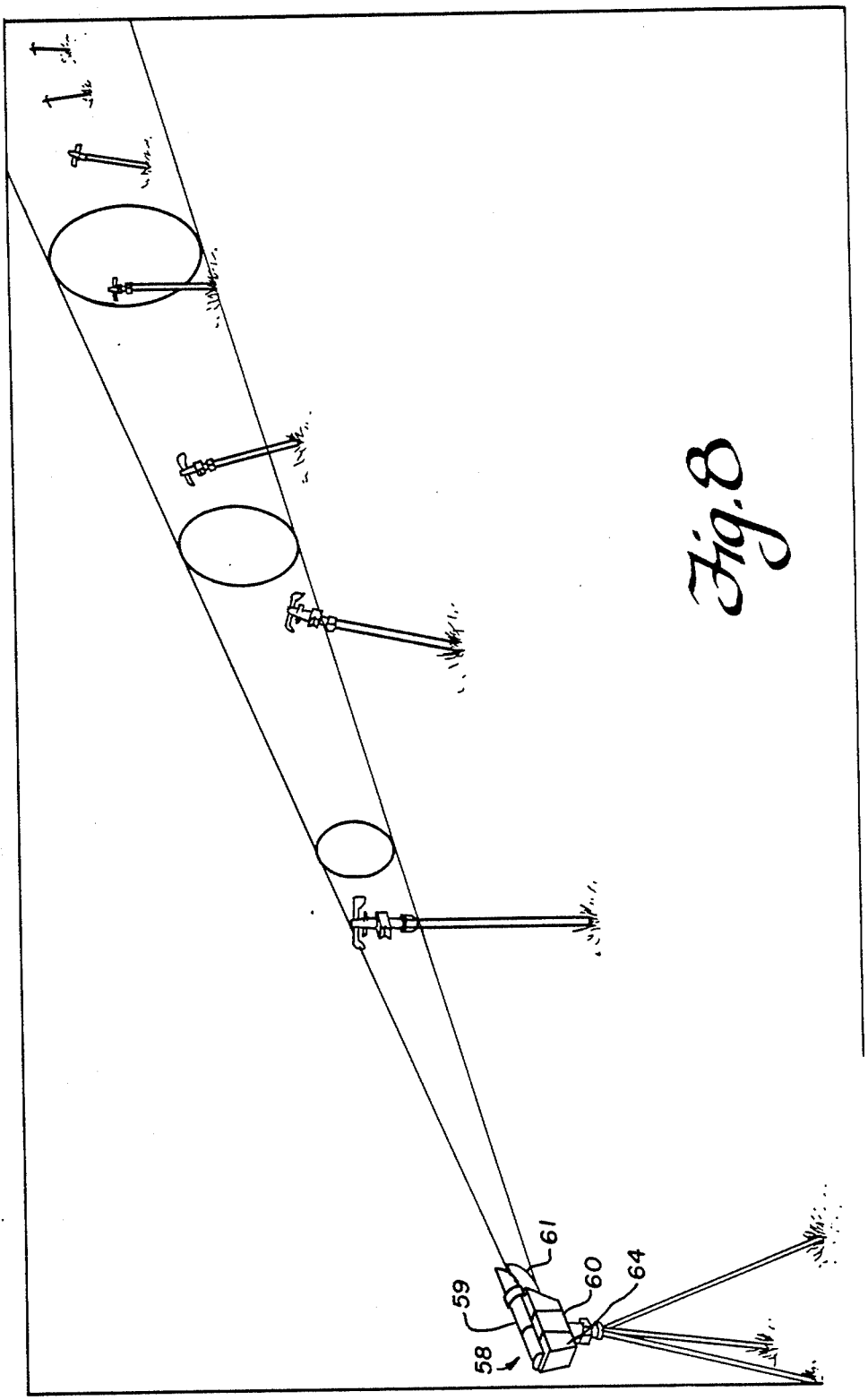
FIG. 8 is a more detailed illustration of the apparatus of FIG. 7.
Figure 9:
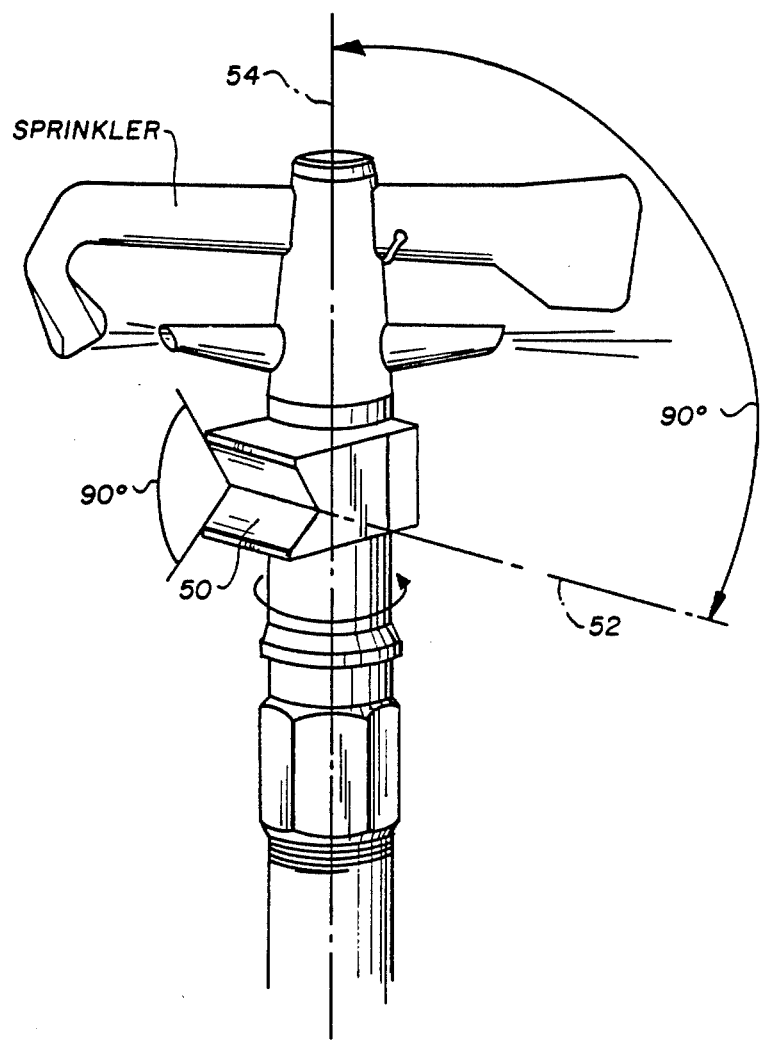
FIG. 9 is a detailed illustration of a reflector mounted on a rotary sprinkler.

Reference is now made to FIGS. 7, 8 and 9 which illustrate apparatus for monitoring the rotation of rotating bodies constructed and operative in accordance with an embodiment of the present invention The illustrations illustrate the invention with particular reference to a system for monitoring the functioning of sprinklers. It is understood however, that the application of the invention is not limited to use with sprinklers.

The heart of the apparatus is shown in FIG. 9 and comprises a reflecting right angle prism 50 which is mounted as illustrated on a rotating member. A particular feature of the right angle prism is that it reflects an incident light beam which is perpendicular to the line of intersection of the two reflecting surfaces of the prism by exactly 180°. Thus when the right angle prism is mounted on the rotating member such that the line 52 of intersection is perpendicular to its axis of rotation 54 then the prism will be brought, at one point within each rotation to a position from which it reflects the light beam back to its source. It is a further important feature that the time period during which the light is reflected back to its source is very small compared with the period of rotation. This arrangement thus overcomes the difficulties which would be encountered if a corner cube prism or other type of retroreflector would be used, since those reflectors reflect by 180° over a relatively large portion of the period of rotation.

FIG. 7 illustrates a system in which each row of sprinklers 56 is provided with a radiation transceiver 58. The expanding beam width of the radiation transceiver is indicated by the more detailed drawing of FIG. 8.

According to a preferred embodiment of the present invention each radiation transceiver 58 comprises a transmitter 59 and a receiver 61 for receiving the reflected radiation pulses, which, as noted above, are characterized in that their length is extremely short as compared with the period of rotation of the sprinkler. This short pulse characteristic enables a large number of rotating members to be monitored with a single transceiver. Counting apparatus 60 and computation apparatus 64 may be provided to indicate whether or not all of the sprinklers are rotating at a given time.

Figure 11:
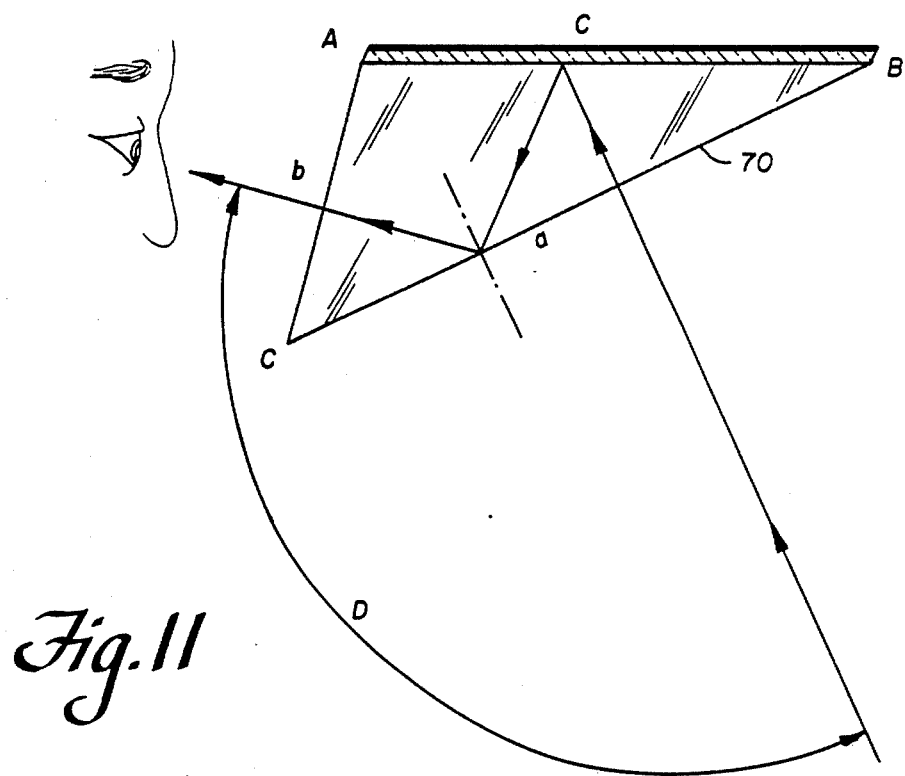
FIG. 11 is a sectional illustration of the eyeglasses of FIG. 10 illustrating the optical paths therethrough.
Figure 10:
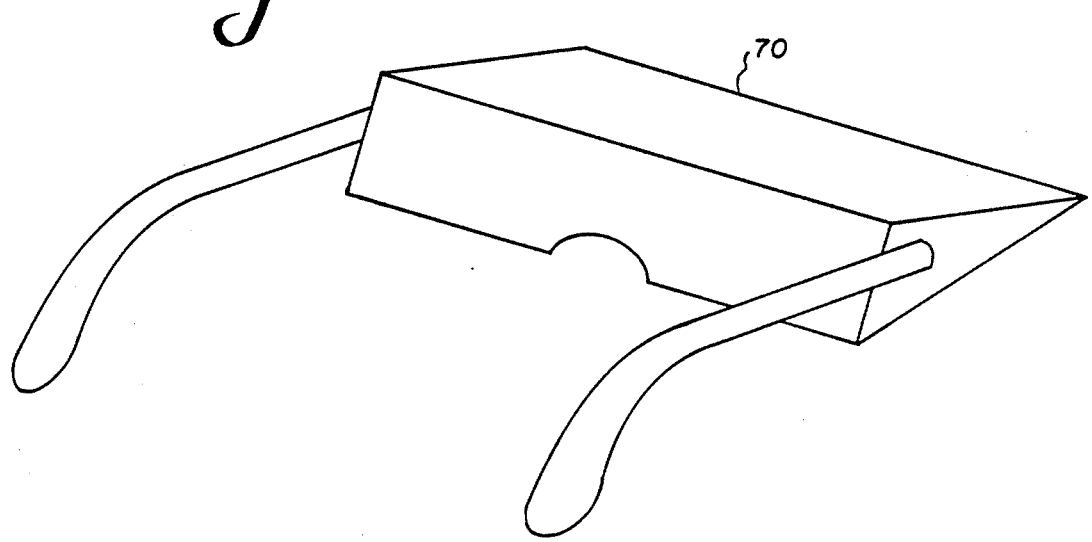
FIG. 10 is a pictorial illustration of prismatic eyeglasses constructed and operative in accordance with the present invention.

Reference is now made to FIGS. 10 and 11 which illustrate prismatic eyeglasses constructed and operative in accordance with an embodiment of the present invention. The purpose of these eyeglasses is to allow a person to see in a horizontal direction while leaning back or lying down. In contrast to known prismatic eyeglasses which display a very annoying parallax problem due to difficulties in achieving the required high tolerance alignment of a pair of prisms, the present invention employs a unitary prism which is viewed through by both eyes of a wearer.

Referring particularly to FIG. 11, it is seen that the eyeglasses comprise a prism 70 having transparent surfaces a and b and a silvered surface c. Light enters the prism through surface a and is reflected from surface c due to the silvering thereof and then is reflected from surface a by total internal reflection. The light leaves the prism through surface b and enters the wearer's eyes.

In order to prevent one-dimensional chromatic aberation in the image seen by the wearer, the relationship between the angles A and B is required to be as follows:

$$A + 3B = 180° \quad (16)$$

The angle D between the light entering the prism and the light entering the wearer's eye will then be given as follows:

$$D = 180° - 2B \quad (17)$$

The angle B is required to be smaller than 60° and the angle D is required to be greater than 60°.

Further in accordance with an embodiment of the present invention, the eyeglasses need not be mountable on a user's face but may be mounted on an external mounting such as over a bed and not onto a wearer.

Figure 12:
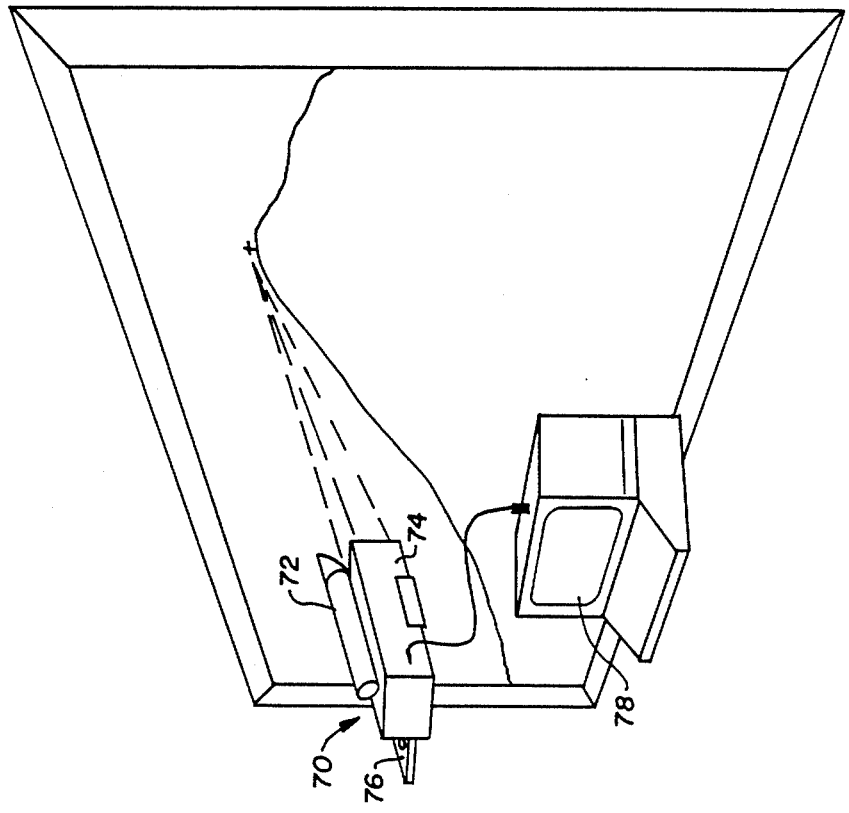
FIG. 12 is an illustration of communications apparatus constructed and operative in accordance with an embodiment of the invention.

Reference is now made to FIG. 12 which illustrates a communications system constructed and operative in accordance with an embodiment of the present invention and comprises at a base location an optical beam transceiver 70 including a beam transmitter 72 and a beam receiver 74 as well as suitable recording and display means, 76 and 78. Disposed at a remote location is an entirely passive transceiver which comprises a retroreflector, a modulator and a transducer. The modulator determines the reflection characteristics of the retroreflector and thus is capable of transmitting information in this way. The modulator is powered by a transducer which receives its power from the transmitted beam from the beam transmitter 72. The modulator may receive its information input from any suitable information source such as a sensor or alternatively a television camera.

Figure 13:
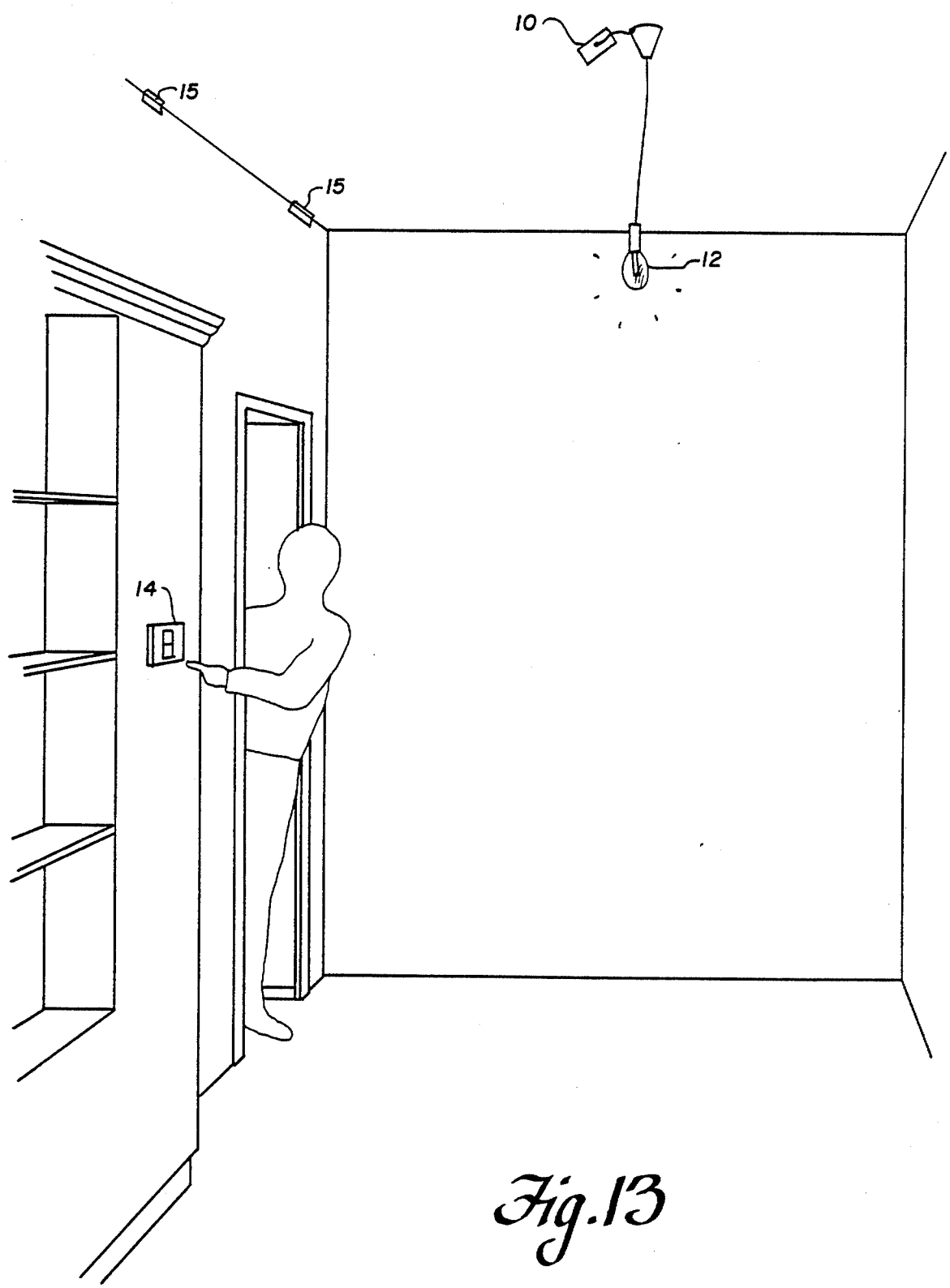
FIG. 13 is a pictorial illustration of remote switch apparatus constructed and operative in accordance with an embodiment of the present invention, installed in a room for controlling room lighting.

Reference is now made to FIG. 13 which illustrates remote switching apparatus constructed and operative in accordance with an embodiment of the present invention and comprising a control module 10 which is associated with an electrical device to be controlled, such as in this example, an electric light 12. Normally, for convenience, the control module 10 will be connected by electrical wires to the device to be controlled and may be mounted thereon or even incorporated therein.

Control module 10, which will be described hereinbelow in greater detail, typically comprises an optical relay switch of conventional design which is operative to open or close an electrical circuit, such as that supplying light 12 with electricity, in response to the presence or absence of an optical input. Control module 10 also typically comprises a radiation source which produces a relatively wide beam. According to an alternative embodiment of the present invention where sufficient ambient light or other radiation is present in the vicinity of the switching apparatus, the separate light source may be eliminated. Control module 10 may also comprise specific radiation sensors or filters which permit operation of the optical relay switch only upon receipt of radiation having predetermined characteristics. Control module 10 may also comprise logic circuitry for decoding a received radiation modulation pattern and comparing it with a predetermined pattern for operating the relay switch only in response to received radiation having the predetermined pattern.

According to a preferred embodiment of the invention, there is provided a remote switch 14 in optical communication with the control module 10. In a preferred embodiment of the invention wherein the control module incorporates a radiation source, the remote switch 14 is operative to receive radiation from the radiation source and to provide in return a modulated radiation output directed to the control module.

According to one embodiment of the invention, the remote switch 14 is in direct line of sight optical communication with the control module. According to an alternative embodiment of the invention, one or more intermediate optical reflectors 15 may be provided in order to direct the optical communication along a pathway that is not likely to be interrupted by persons or objects.

Figure 14:
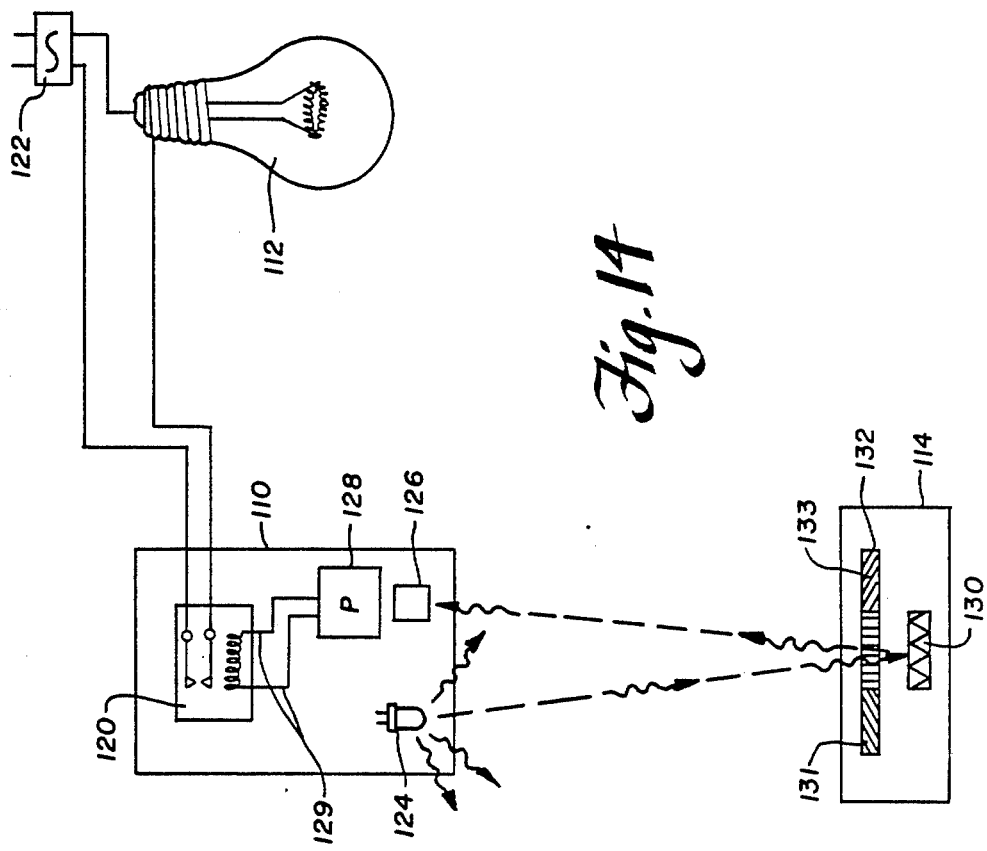
FIG. 14 is a schematic illustration of a preferred embodiment of remote switch apparatus of the type illustrated in FIG. 13.

Reference is now made to FIG. 14 which illustrates, in schematic form, remote switching apparatus constructed and operative in accordance with an embodiment of the present invention. The control module 110 contains a relay operated switch 120 which governs the supply of current from a source of electrical power 122 to an electrical device to be controlled, such as light bulb 112. The control module also comprises a light source 124 which may provide a beam of desired dispersion of polychromatic or monochromatic light. A detector assembly 126 receives radiation and provides an output indication of radiation receipt to processing circuitry 128, which in turn provides an operating signal to the control leads 129 of relay operated switch 120, for operating switch 120. Where a single detector is employed, processing circuitry 128 may be eliminated. Where a plurality of detectors are employed in detector assembly 126, logic circuitry is provided for determining a predetermined pattern of coincidence of outputs or non-coincidence thereof for operating the switch 120.

According to a preferred embodiment of the present invention, the remote switch 114 comprises a retroreflector 130. Retroreflector 130 may be of entirely conventional construction such as a corner cube and is operative to reflect radiation received by it back to the source of the incident radiation. Disposed along the radiation pathway communicating with the retroreflector is a remote switch activated radiation modulating assembly 132, which is operative to modulate the radiation reflected back to the control module in response to actuation of the switch.

It may be appreciated that the switching system of the present invention may operate in a number of possible modes. In one mode, the remote switch 114 provides only one type of signal to the control module 110, i.e. a change status signal. In such a case, the processing circuitry 128 of the control module is operative to operate switch 120 to change its status from whatever it was previously. Alternatively, the remote switch 114 may provide two types of signals to the control module 110, i.e. ON and OFF. In such a case the processing circuitry 128 need not interpret the received signal on the basis of the current status of the switch.

Where the switching apparatus operates in the first mode, the modulating assembly 132 may simply comprise an opaque mask or any other single parameter, "single bit" modulator which provides a reflected beam to the control module only when the switch is actuated, or alternatively interrupts the beam only when the switch is actuated. In such a case, the remote switch modulating assembly 132 may comprise a simple spring loaded push button, which provides or alternatively interrupts the beam only when the button is pushed, by means of a mask attached thereto. Alternatively, the mask may be replaced by a colored filter or a polarizing filter which is matched to a corresponding filter at the detector assembly 126 of the control module.

Where the switching apparatus operates in the alternative mode described hereinabove, a two position switch must be provided by the modulating assembly 132. Where a mask is used, one position may correspond to masking of the radiation, while the other position may correspond to uninterrupted passage thereof. Where filters are used, one position may correspond to one kind of filter 131 and another position may correspond to another kind of filter 133 or no filter.

If a more sophisticated system is desired to avoid possible undesired switch operation due to spurious radiation being received by the control module detector assembly 126, it is possible to provide each operating position of the modulating assembly 132 with a modulation signature, which may comprise a combination of parameters. One arrangement of such signatures could be the following:

|     | Polarization | Color |
| --- | --- | --- |
| ON | Right | Green |
| OFF | Left | Red |

Additional additive combinations of parameters may alternatively be used. Phase modulation may also be used.

According to a further embodiment of the invention, time modulation of the radiation may also be provided wherein actuation of the switch provides a signature indicated by the following sequence:

| TIME | Color | Polarization |
|---|---|---|
| 1 | Red | Right |
| 2 | Green | Left |
| 3 | Green | Right |
| 4 | Red | Left |
| 5 | Red | Right |

It is appreciated that a multiposition switch may be constructed in accordance with the above teachings.

It may be appreciated that any other suitable switching system may alternatively be employed for providing a desired modulation of the signal.

Reference is now made to FIG. 15 which provides a block diagram illustration of circuitry employed in the remote switch apparatus of FIG. 14. The circuitry employs a pair of detectors 140 and 142 which are located behind suitable filters, such as polarization filters or color filters for sensing the provision of a suitably modulated signal from the remote switch 114. Each of detectors 140 and 142 may comprise a conventional photomultiplier or any other suitable detector. The output of each of the detectors 140 and 142 is supplied to a suitable threshold circuit 144 and 146 which defines a threshold for detection in order to prevent unwanted operation due to spurious signals. The outputs of threshold circuits 144 and 146 are supplied to an AND gate 143, and in parallel to a NAND gate 150. Additionally, the output of circuit 144 is supplied to an inverter 152 and the output of the inverter is supplied to a second AND gate 154 together with the output from circuit 146. The output of circuit 146 is supplied to a second inverter 156 whose output is supplied to a third AND gate 158 together with the output from circuit 144.

It may be appreciated that for each modulation bit, only one of gates 148, 150, 154 and 158 will provide an output. The outputs of gates 148, 150, 154 and 158 are supplied to register circuitry 160 which records a sequence of outputs and which is associated with a comparator 162. Comparator receives the output of register circuitry 160 and the output of a memory 164 which stores a predetermined sequence of modulation combinations. When the received modulation combination matches that stored in memory 164, comparator 164 provides an output signal which causes operation of the relay controlled switch 120.

Where the switching system operates in the first mode, the modulation of the signal provides a status change signal and thus the output of comparator 162 is provided to a second comparator which senses the presence of a status signal from the relay controlled switch, indicating that the switch is either open or closed. If the status signal indicates that the switch is open, voltage is supplied to control leads 129 to close the switch, and if the status signal indicates that the switch is closed, voltage is removed from control leads 29, thus opening the switch.

Where the switching system operates in the second mode, an additional comparator 166 is provided which receives an input from memory 146 and output from register circuitry 160. In this case memory 164 contains two code sequences, one corresponding to an ON signal and the other corresponding to an OFF signal. The output of comparator 162 corresponds to an ON signal and provides a voltage to control leads 129 and the output of comparator 166 corresponds to an OFF signal and provides no voltage to control leads 129 according to a typical embodiment.

It will be appreciated by persons skilled in the art that the present invention is not limited to what has been particularly shown and described hereinabove. Rather the scope of the present invention is defined only by the claims which follow

I claim:

1. Apparatus for switching power to an electrical device comprising:

optically controllable first switching means for switching power to said electrical device including: (a) power control means for controlling the power to said electrical device, (b) means for emitting unguided radiation from said first switching means, and (c) radiation detection means for detecting reflected and modulated unguided radiation and providing a signal for controlling said power control means; and second switching means, remote from said first switching means and only optically coupled thereto for reflecting and modulating said unguided radiation from said first switching means back to said first switching means, including: (a) reflection means for reflecting said unguided radiation, (b) a manually operative switch, having at least two positions, (c) modulating means for modulating said unguided radiation in accordance with a position of said switch;

wherein the power to the electrical device is controlled depending upon the reflected and modulated unguided radiation from said second switching means and returned to said first switching means.

2. A remote switching apparatus according to claim 1 wherein said power control means is a relay.

3. A remote switching apparatus according to claim 1 wherein said reflection means includes a retroreflector and said modulating means is disposed between said retroreflector and said first switching means such that said unguided radiation is reflected by said retroreflector, passes through said modulation means where it is modulated, and returns to said first switching means, thereby defining an optical path between said first and second switching means.

4. A remote switching apparatus according to claim 1 wherein said modulating means includes a polarizer.

5. A remote switching apparatus according to claim 1 wherein said modulating means includes at least one filter which is selectably interposed across said path.

6. A remote switching apparatus according to claim 5 wherein said filter is a color filter.

7. Remote switching apparatus according to claim 1 wherein said radiation detection means includes logic circuit means for identifying modulated radiation received by said radiation detection means and for providing and signal to said power control means, such that said power control means controls the power to the electrical device in response to said signal.

8. A remote switching apparatus according to claim 7 wherein said detection means generates detection signals depending upon the unguided and modulated radiation incident upon said first switching means, and wherein said logic circuit means includes coincident gate means for receiving said detection signals and generating coincidence signals therefrom, and wherein said logic circuit means generates said signal in response to said coincidence signals.

9. A remote switching apparatus to claim 8 wherein said logic circuit means comprises a memory device and comparison means for generating said signal when comparison means determines agreement between said coincidence signals and a sequence stored in said memory device means.

10. Apparatus for switching power to an electrical device comprising:
optically controllable first switching means for switching power to said electrical device including: (a) power control means for controlling the power to said electrical device, (b) means for emitting unguided radiation from said first switching means, and (c) radiation detection means for detecting reflected and modulated unguided radiation and providing a signal for controlling said power control means; and
second switching means, remote from said first switching means and only optically coupled thereto for reflecting and modulating said unguided radiation from said first switching means back to said first switching means, including: (a) reflection means for reflecting said unguided radiation, (b) a manually operative switch, having at least two positions, (c) polarization means for polarizing or not polarizing said unguided radiation in accordance with a position of said manually operative switch;
wherein the power to the electrical device is controlled depending upon the reflected unguided radiation from said second switching means and returned to said first switching means.

11. A remote switching apparatus according to claim 10 wherein said power control means is a relay.

12. A remote switching apparatus according to claim 10 wherein said reflection means includes a retroreflector and said polarization means is disposed between said retroreflector and said first switching means such that said unguided radiation is reflected by said retroreflector, passes through said polarization means where it may be polarized, and returns to said first switching means, thereby defining an optical path between said first and second switching means.

13. Remote switching apparatus according to claim 10 wherein said detection means includes logic circuit means for identifying polarized radiation received by said radiation detection means and for providing said signal to said power control means, such that said power control means controls the power to the electrical device in response to said signal.

14. A remote switching apparatus according to claim 13 wherein said detection means generates detection signals depending upon the unguided radiation incident upon said first switching means, and wherein said logic circuit means includes coincident gate means for receiving said detection signals and generating coincidence signals therefrom, and wherein said logic circuit means generates said signal in response to said coincidence signals.

15. A remote switching apparatus to claim 14 wherein said logic circuit means comprises a memory device and comparison means for generating said signal when said comparison means determines agreement between said coincidence signals and a sequence stored in said memory device.

* * * * *